United States Patent
An et al.

(10) Patent No.: US 11,235,726 B2
(45) Date of Patent: Feb. 1, 2022

(54) HINGE STRUCTURE FOR AIR BAG DOOR

(71) Applicants: HYUNDAI MOTOR COMPANY, Seoul (KR); KIA MOTORS CORPORATION, Seoul (KR); DUCK YANG INDUSTRY CO., LTD., Ulsan (KR)

(72) Inventors: Jae Hyun An, Seosan-si (KR); Jung Hoon Woo, Suwon-si (KR); In Soo Han, Uiwang-si (KR); Seung Sik Han, Hwaseong-si (KR); Ik Jin Jung, Ansan-si (KR); Seung Ho Kim, Suwon-si (KR); Jang Won Lee, Suwon-si (KR)

(73) Assignees: HYUNDAI MOTOR COMPANY, Seoul (KR); KIA MOTORS CORPORATION, Seoul (KR); DUCK YANG IND. CO., LTD., Ulsan (KR)

( * ) Notice: Subject to any disclaimer, the term of this patent is extended or adjusted under 35 U.S.C. 154(b) by 0 days.

(21) Appl. No.: 16/916,963

(22) Filed: Jun. 30, 2020

(65) Prior Publication Data
US 2021/0016738 A1 Jan. 21, 2021

(30) Foreign Application Priority Data
Jul. 15, 2019 (KR) .................. 10-2019-0085249

(51) Int. Cl.
*B60R 21/215* (2011.01)
*B60R 21/235* (2006.01)
*B60R 21/205* (2011.01)

(52) U.S. Cl.
CPC .......... *B60R 21/215* (2013.01); *B60R 21/235* (2013.01); *B60R 21/205* (2013.01);
(Continued)

(58) Field of Classification Search
CPC ........... B60R 2021/21537; B60R 2021/21506; B60R 2021/23542; B60R 2021/2161;
(Continued)

(56) References Cited

U.S. PATENT DOCUMENTS

| | | | |
|---|---|---|---|
| 2005/0269804 A1* | 12/2005 | Yamada | .................. B29C 66/54 280/728.3 |
| 2012/0126514 A1* | 5/2012 | Choi | ..................... B60R 21/215 280/728.3 |
| 2018/0345898 A1* | 12/2018 | An | ........................ B60R 21/217 |

FOREIGN PATENT DOCUMENTS

KR    2012-0045640 A    5/2012

* cited by examiner

*Primary Examiner* — Keith J Frisby
(74) *Attorney, Agent, or Firm* — McDonnell Boehnen Hulbert & Berghoff LLP

(57) ABSTRACT

The present invention provides a hinge structure for an air bag door. The hinge structure includes a housing disposed inside a crash pad, an air bag disposed inside the housing, an air bag door disposed on a rear surface of the crash pad adjacent to the air bag, a hinge portion disposed on at least a portion of a rear surface of the air bag door, and a scrim member disposed at least a portion of the hinge portion, the housing and the air bag door, all the components constituting an air bag assembly, wherein the hinge portion is constructed so as to break when the air bag door is opened, and the scrim member serves to enable the air bag door to be opened while being connected to the housing after the hinge portion breaks.

10 Claims, 4 Drawing Sheets

(52) U.S. Cl.
CPC ............... *B60R 2021/21506* (2013.01); *B60R 2021/21537* (2013.01); *B60R 2021/23509* (2013.01); *B60R 2021/23542* (2013.01)

(58) Field of Classification Search
CPC . B60R 21/215; B60R 21/205; B60R 21/2338; B60R 21/216; B29L 2031/3038
USPC .............................................. 280/728.3, 732
See application file for complete search history.

[ Section B ]

HINGE STRUCTURE FOR AIR BAG DOOR

CROSS REFERENCE TO RELATED APPLICATION

This application claims under 35 U.S.C. § 119(a) the benefit of priority to Korean Patent Application No. 10-2019-0085249 filed on Jul. 15, 2019, the entire contents of which are incorporated herein by reference.

BACKGROUND

(a) Technical Field

The present disclosure relates to a hinge structure for an air bag door. More particularly, it relates to a hinge structure for an air bag door, which eliminates problems in that an air bag door is unstably opened due to an air bag, which expands by high pressure, in that a hinge portion of the air bag door breaks before expansion of the air bag and in that a potential breakage of an air bag assembly is generated due to increase in size of the air bag.

(b) Background Art

Generally, an air bag, which is mounted on a front passenger's seat, is constructed such that an air bag module is provided in a crash pad. In the event of collision of a vehicle, an air bag door is opened, and then expands, thereby absorbing impact to a passenger.

In order to improve appearance, an invisible air bag opening part, which is provided at a crash pad, is integrally formed with the crash pad such that an opening line is invisible from the outside. A skin opening part is formed in an inner surface of a skin layer so as to allow a panel to be easily opened upon expansion of the air bag.

The air bag opening part is provided with the opening line, which is decreased in thickness so as to form a relatively weak portion in the crash pad, and thus an air bag door is opened along the opening line, which has a relatively thin thickness, upon expansion of the air bag. Generally, the air bag opening part is prepared by performing injection molding of the air bag opening part such that the opening line has a relatively thin thickness or by forming a fine groove through secondary processing using a laser beam after injection molding of the crash pad.

FIG. 1 is a cross-sectional view illustrating a conventional hinge structure for an air bag opening part. As illustrated in FIG. 1, a crash pad 1 is provided in front of a front passenger's seat, and an air bag module 2 is provided inside the crash pad 1 so as to be spaced apart therefrom.

The air bag module 2 is constructed so as to allow an air bag to expand in the event of collision of a vehicle. As illustrated in the drawing, the inner surface of the crash pad 1, which faces the air bag module 2, is provided with an air bag opening part 10 having a hinge portion 11.

Since the air bag opening part 10 is typically fused to the inner surface of the crash pad 1 and is cut at the end thereof opposite the hinge portion 11, the air bag door 10 is rotated outwards about the hinge portion 11, serving as a rotational axis, upon expansion of the air bag.

However, because such a hinge structure shown in FIG. 1 is constructed such that the air bag opening part 10 is made of a single material and is applied to an air bag having a relatively low explosion pressure such as a depowered air bag, which is used in Korea and Europe, there is a problem in that the air bag opening part is not normally opened and the hinge portion breaks upon expansion of the air bag when the structured is applied to an air bag having a relatively high explosion pressure, which is used in North America.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a hinge structure for an air bag door, which allows the air bag door to be easily opened by virtue of a scrim member, which is positioned at at least a portion of the hinge portion and the air bag door.

Furthermore, another object of the present disclosure is to provide a hinge structure for an air bag door, which is constructed such that a hinge portion breaks and an air bag door is rotated while being connected to a scrim member.

The objects of the present disclosure are not limited to the above-mentioned objects. Other specific details of the present disclosure will be apparent from the following detailed description and the embodiments. The objects of the present disclosure may be accomplished by means disclosed in the accompanying claims and combinations thereof.

A hinge structure for an air bag door for accomplishing the objects of the present disclosure is constructed as follows.

In one aspect, the present disclosure provides a hinge structure for an air bag door including a housing disposed inside a crash pad, an air bag disposed inside the housing, an air bag door disposed on a rear surface of the crash pad adjacent to the air bag, a hinge portion disposed at at least a portion of a rear surface of the air bag door, and a scrim member disposed on at least a portion of the hinge portion, the housing and the air bag door, all the components constituting an air bag assembly, wherein the hinge portion is constructed so as to break when the air bag door is opened, and the scrim member serves to enable the air bag door to be opened while being connected to the housing after the hinge portion breaks.

In a preferred embodiment, the hinge structure for an air bag door may further include a stress-inducing portion, which is provided on the air bag door and to which stress of the air bag is applied.

In another preferred embodiment, the hinge structure for an air bag door may further include a scrim hole formed in the housing so as to allow the scrim member to be fused to a main crash pad.

In still another preferred embodiment, the hinge portion may include a notch, which is formed in a location which faces the air bag.

In yet another preferred embodiment, the hinge portion may be constructed so as to break starting from the notch when the air bag expands.

In still yet another preferred embodiment, the scrim member may be made of a woven fabric, which is composed of warp threads and weft threads, each of the warp threads, to which tensile force is applied when the air bag door is opened, including one or more multiple folded layers at which the warp threads intersect the weft threads.

In a further preferred embodiment, at least one of the warp threads and the weft threads may be made of polyvinyl chloride (PVC).

In another further preferred embodiment, at least one of the warp threads and the weft threads may be coated with primer.

In still another further preferred embodiment, the scrim member may be disposed inside the air bag door and the housing, and a portion of the scrim member that is positioned at the housing may be higher than a portion of the scrim member that is positioned at the air bag door.

In yet another further preferred embodiment, a thickness of a cross-section of the air bag door may be smaller than a thickness of a cross-section of the housing adjacent to the air bag door.

In still yet another further preferred embodiment, the housing may include a thickness-increased portion, which is positioned so as to be adjacent to the air bag door and so as to be adjacent to the hinge portion.

Other aspects and preferred embodiments of the disclosure are discussed infra.

It is understood that the term "vehicle" or "vehicular" or other similar term as used herein is inclusive of motor vehicles in general, such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example vehicles powered by both gasoline and electricity.

BRIEF DESCRIPTION OF THE FIGURES

The above and other features of the present disclosure will now be described in detail with reference to certain exemplary embodiments thereof, illustrated in the accompanying drawings which are given hereinbelow by way of illustration only, and thus are not limitative of the present disclosure, and wherein.

Figure 1:
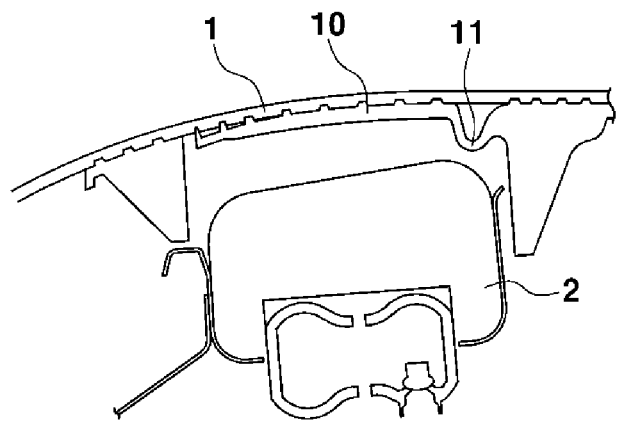
FIG. 1 is a cross-sectional view of a conventional hinge structure for an air bag door in which a hinge portion includes a steel insert.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The present disclosure will now be described more fully with reference to the accompanying drawings, in which preferred embodiments of the disclosure are shown. This disclosure may, however, be embodied in many different forms, and should not be construed as being limited to the embodiments set forth herein. Rather, these embodiments are provided so that this disclosure will be thorough and complete and will fully convey the scope of the disclosure to those skilled in the art.

The terms "part", "door" and the like used in the specification mean units for processing at least one function or operation, which can be implemented by hardware components, software components, or combinations thereof.

The term "direction of a warp thread" used in the specification may be defined as a direction in which tensile force is applied to a scrim member when an air bag door is rotated and opened, and the term "direction of a weft thread" used in the specification may be defined as a direction perpendicular to the direction of a warp thread.

Furthermore, the term "break" used in the specification, which includes all concepts such as interfacial delamination, partial delamination, partial breakage and complete breakage, means a state in which the connection between a hinge portion and an air bag door is at least partially released before expansion of an air bag.

FIGS. 2 to 7 are views illustrating a hinge structure for an air bag door according to the present disclosure.

The present disclosure relates to the hinge structure for an air bag door 110, which is constructed such that a hinge portion 120 of the air bag door 110 breaks when an air bag 200 is opened and such that the air bag door 110 is rotated to the outside of a crash pad 300 by virtue of the hinge portion 120 and a scrim member 130, which is integrally formed with the air bag door 110.

In order to overcome a problem in that the air bag door 110 is separated from the crash pad 300 due to breakage of the hinge portion 120, the hinge portion 120 is constructed to contain the scrim member 130, which is woven using warp threads 132 and weft threads 133, such that the scrim member 130 is positioned at at least a portion of the air bag door 110.

Accordingly, the hinge structure for an air bag door according to the present disclosure is constructed such that the air bag door 110, which is coupled to a housing 400 by means of retaining force of the scrim member 130, is opened by stress applied from the air bag 200 when the air bag 200 expands.

In an embodiment, the scrim member 130 is constructed such that the portion of the scrim member 130 that is positioned at the housing 400 is higher than the portion of the scrim member 130 that is positioned at the air bag door 110.

Figure 2:
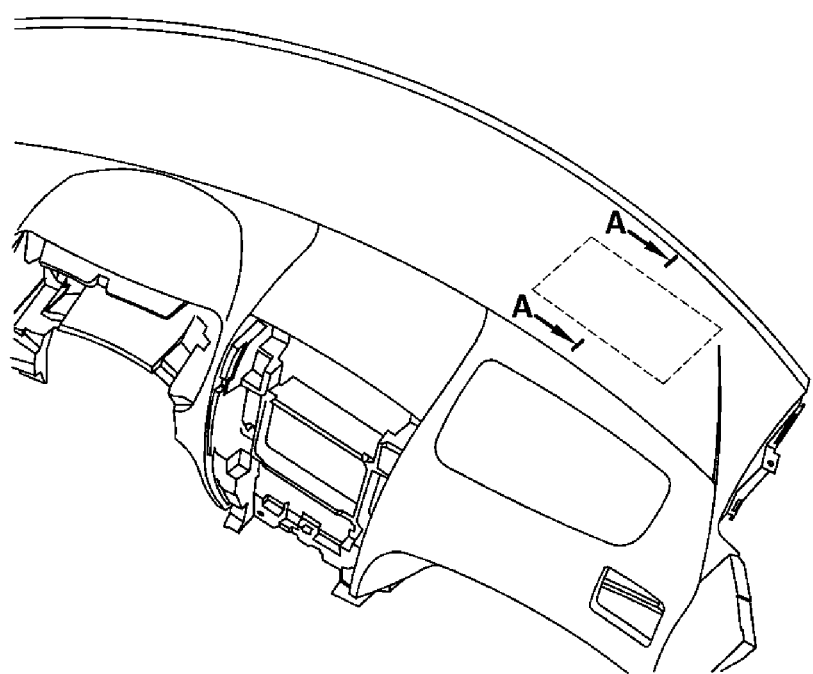
FIG. 2 is a perspective view illustrating a crash pad including a hinge structure for an air bag door according to an embodiment of the present disclosure.
Figure 3:
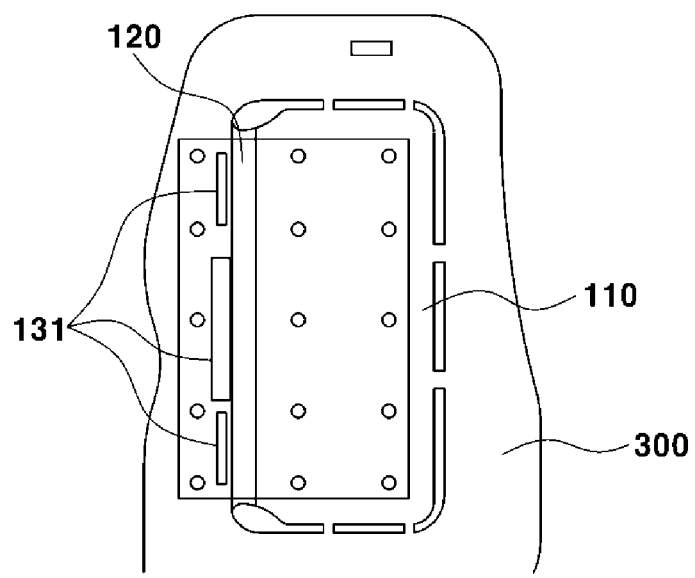
FIG. 3 is a rear view illustrating the hinge structure for an air bag door according to an embodiment of the present disclosure.

FIG. 2-3 illustrate the crash pad 300, which includes the hinge structure for the air bag 110 according to an embodiment of the present disclosure.

As illustrated in the drawings, the hinge structure for the air bag door 110 according to an embodiment of the present disclosure is applicable to the air bag 200 for a front passenger's seat, which is positioned inside the crash pad 300.

Figure 4:
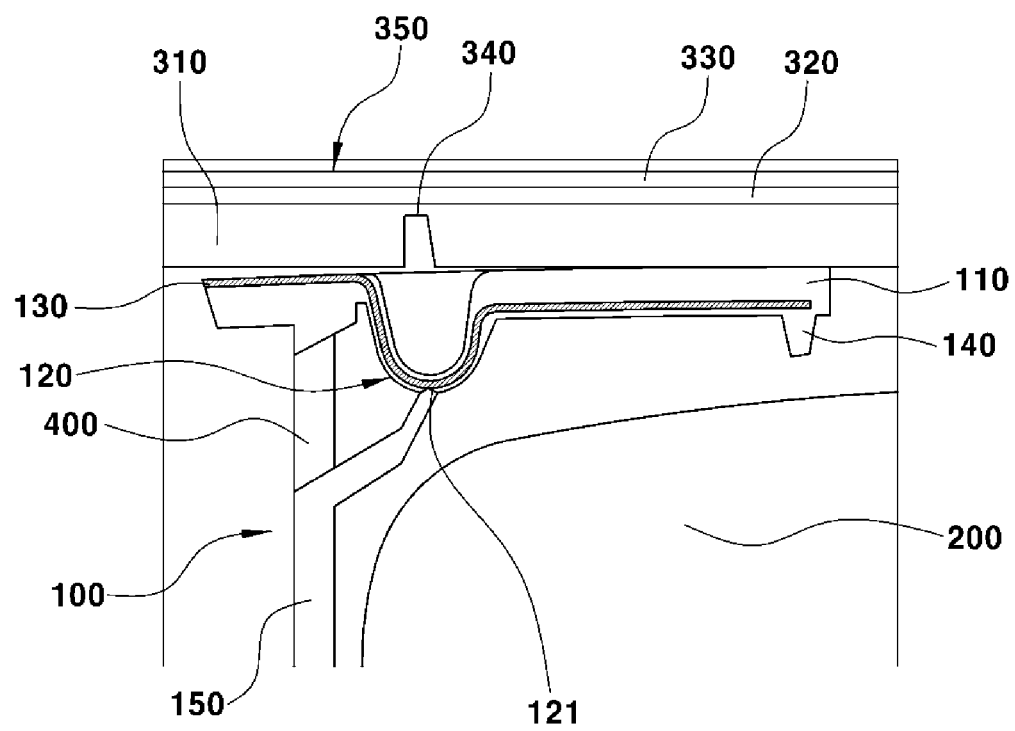
FIG. 4 is a side cross-sectional view illustrating the hinge structure for an air bag door according to an embodiment of the present disclosure.

As shown in FIG. 4, the crash pad 300 includes a main crash pad 310 and a urethane layer 320 layered on the main crash pad 310. The air bag door 110 is positioned on the rear surface of the main crash pad 310.

In an embodiment, any of various cloths 330 may be layered on the urethane layer 320.

The main crash pad 310, the urethane layer 320 and the cloth 330, which are positioned so as to correspond to the air bag door 110, may include an opening-inducing portion, which is constructed so as to allow the air bag door 110 to be easily opened.

In an embodiment of the present disclosure Ufa the main crash pad 310 may include a tear seam 340, which is formed at a location adjacent to one end of the air bag door 110, which is rotated to the outside of the crash pad 300, so as to allow the air bag door 110 to be easily opened.

FIG. 3 shows a rear view of the hinge structure for the air bag door 110, which illustrates an air bag assembly 100, which includes the air bag door 110, the hinge portion 120 and scrim holes 131.

The air bag assembly 100 is constructed so as to include the air bag 200, the air bag door 110, the hinge portion 120, the scrim member 130 and the scrim holes 131 and so as to be positioned inside the crash pad 300.

The housing 400 of the air bag assembly 100 is provided in the upper surface thereof with a plurality of tear lines along the contour of the air bag door 110 so as to allow the air bag door 110 to be easily opened upon expansion of the air bag 200

The hinge portion 120 may include a notch 121, which is formed in at least a portion of the hinge portion 120, so as to break upon expansion of the air bag 200. The thickness of the air bag assembly 100, which is positioned opposite the air bag door 110 with respect to the notch 121, may be larger than the thickness of the air bag door 110.

Specifically, the thickness of the cross-section of the housing 400, which is located opposite and adjacent to the air bag door 110 with respect to the hinge portion 120, is larger than the thickness of the cross-section of the air bag door 110. The hinge portion 120 is constructed so as to perform interfacial delamination as the air bag 200 expands.

The hinge structure for the air bag door 110 according to the present disclosure is constructed such that the hinge portion 120 is provided at a location at which the air bag door 110 is connected to the housing 400 and the scrim member 130 is integrally formed with at least a portion of the housing 400, the air bag door 110 and the hinge portion 120 of the air bag assembly 100.

When the hinge portion 120 breaks upon expansion of the air bag 200, the scrim member 130 serves as a rotational axis of the air bag door 110.

Figure 6:
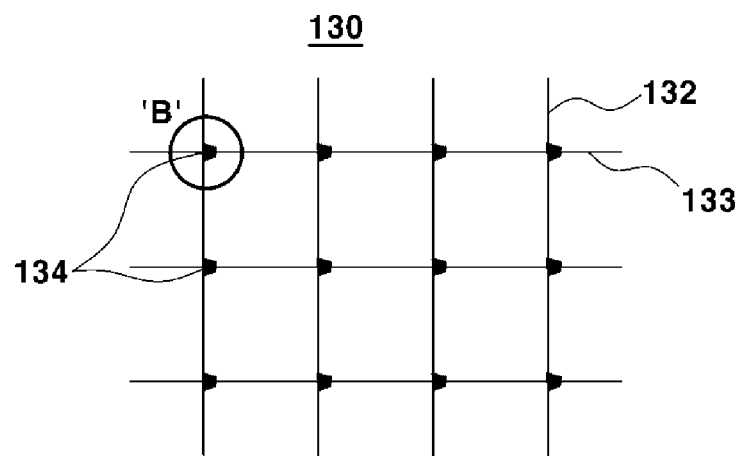
FIG. 6 is a plan view illustrating a scrim member of the hinge structure for an air bag door according to an embodiment of the present disclosure.

As shown in FIG. 6, the scrim member 130 may be made of the warp threads 132 and the weft threads 133 through a weaving process. The warp threads 132 and the weft threads 133 may be produced so as to have a tensile strength of at least 3000N/5 cm.

Specifically, a plurality of warp threads 132 are arranged so as to extend in a warp direction, and weft threads 133 are arranged so as to intersect the warp threads 132, whereby the resultant scrim member 130 becomes a mesh-type fabric.

The weft threads 133 may be twisted so as to be woven with respect to the warp threads 132 in a leno weave manner.

In an embodiment of the present disclosure, the warp threads 132 and the weft threads 133, which constitute the scrim member 130, may be made from polyvinyl chloride (PVC), and the polyvinyl chloride (PVC) threads may be coated with primer.

The warp threads 132 may be disposed in a larger number of layers than the weft threads 133. The warp threads 132 are oriented such that a tensile load is applied in a direction in which the warp threads 132 extend when the air bag 200 expands.

The scrim member 130 may be integrally formed with the air bag assembly 100 such as the air bag door 110 and the housing 400 through insert injection molding. The scrim member 130 may be positioned at at least a portion of the air bag door 110 and the housing 400, and may be positioned inside the hinge portion 120.

The warp threads 132 and the weft threads 133 according to the present disclosure may be woven in any weaving manner as long as the warp threads 132 and the weft threads 133 exhibit a tensile strength of 3000N/5 cm. The weaving manner and the kind of fabric are not limited.

FIG. 4 is a side cross-sectional view taken along line A-A of FIG. 2. As illustrated in the drawing, the air bag assembly 100 includes the housing 400, the air bag 200 disposed inside the housing 400, the air bag door 110 disposed over the air bag 200 and on the rear surface of the crash pad 300, and a stress-inducing portion 140 disposed at the rear surface of the air bag 110 so as to transfer stress upon expansion of the air bag 200.

The hinge portion 120 is provided at the point where the air bag door 110 meets the housing 400 of the air bag assembly 100. The scrim member 130 is positioned at at least a portion of the air bag door 110, the hinge portion 120 and the housing 400.

The stress-inducing portion 140 may be positioned at the other end of the air bag door 110, and the hinge portion 120 may be positioned at the one end of the air bag door 110. A hinge protector 150 is disposed adjacent to the hinge portion 120. When the air bag 200 expands, stress generated by the air bag 200 is concentrated on the stress-inducing portion 140.

The scrim member 130 may be integrally formed with the air bag assembly 100 upon injection molding of the air bag assembly 100. The scrim member 130 may be positioned inside the air bag door 110, the hinge portion 120 and the housing 400.

The portion of the scrim member 130 that is positioned at the housing 400 may be positioned closer to the main crash pad 310 than the portion of the scrim member 130 that is positioned at the air bag door 110. The portion of the scrim member 130 that is positioned at the housing 400 may be secured to the housing 400 by virtue of the physical binding force with the main crash pad 310 upon expansion of the air bag door 110.

Furthermore, the upper surface of the housing 400, which is adjacent to the main crash pad 310 and the scrim member 130, is fused, thereby increasing the physical binding force upon expansion of the air bag door 110.

The scrim member 130 is positioned at the housing 400 including the scrim holes 131 such that the main crash pad 310 is introduced into the scrim holes 131 and is fused thereto. Accordingly, when the hinge portion 120 having the notch 121 breaks, the air bag door 110 is rotated about the scrim member 130 without separation because the main crash pad 310 is introduced into the scrim holes 131 and is fused thereto.

In other words, since the main crash pad 310 is introduced into the scrim holes 131 and is fused thereto, the scrim member 130 is integrally secured to the housing 400.

More specifically, the warp threads 132, which constitute the scrim member 130, extend in a direction in which the air bag door 110 is opened and are arranged so as to be parallel to each other. At this time, the scrim member 130 is elongated in a longitudinal direction by the opening force of the air bag door 110.

In an embodiment of the present disclosure, the air bag door 110 may include a double door and a single door. The other end of the air bag door 110 that is adjacent to the hinge portion 120 includes a tear line, thereby allowing the air bag door 110 to be easily opened.

The crash pad 300 includes the tear seam 340, which is disposed at a location corresponding to the one end of the air bag door 110, thereby allowing the crash pad 300 to be easily opened upon opening of the air bag door 110.

The tear seam 340 may be positioned in the main crash pad 310, or may be positioned at at least a portion of the urethane layer 320 and the cloth 330.

The stress-inducing portion 140 may be positioned on the rear surface of the air bag door 110. More specifically, the stress-inducing portion 140 may be positioned adjacent to the other end of the air bag door 110.

The stress-inducing portion 140 may be composed of a plurality of ribs, and may be disposed at a position at which the air bag 200 meets the air bag door 110 when the air bag 200 expands.

Furthermore, the hinge structure may include the hinge protector 150, which is disposed at a lateral wall of the housing 400 adjacent to the hinge portion 120. The hinge protector 150 may be disposed at the lower end of the hinge portion 120 and is inclined toward the stress-inducing portion 140 in order to prevent breakage of the hinge portion 120 upon expansion of the air bag 200 and to cause stress attributable to the first expansion of the air bag 200 to be concentrated on the stress-inducing portion 140.

The position of the hinge protector 150 may be set such that the hinge protector 150 prevents breakage of the hinge portion 120 upon the first expansion of the air bag 200 and that stress attributable to expansion of the air bag 200 is applied to the stress-inducing portion 140 or the air bag 110 and thus the hinge portion 120 breaks upon opening of the air bag door 110.

Accordingly, the hinge protector 150 serves to prevent breakage of the hinge portion 120 before opening of the air bag door 110 and the air bag 200 expands toward the stress-inducing portion 140.

Figure 5:
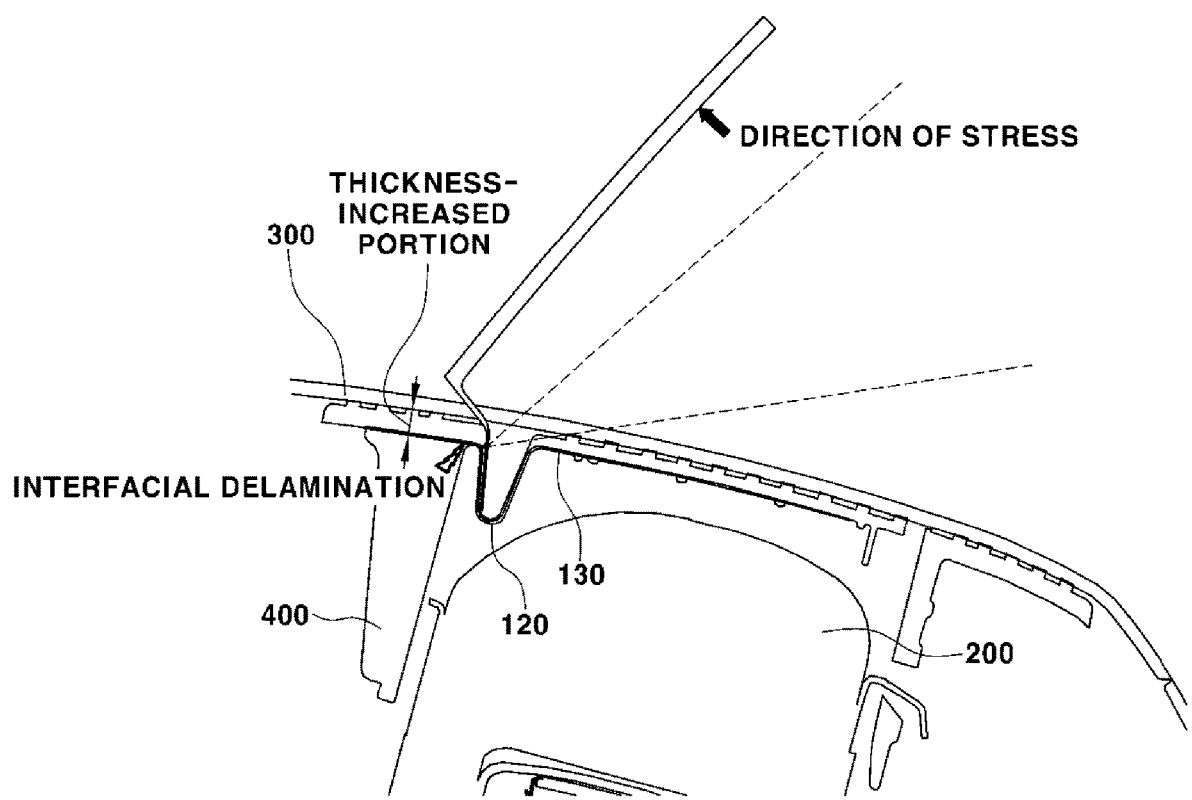
FIG. 5 is a side cross-sectional view illustrating the hinge structure for an air bag door according to an embodiment of the present disclosure, in which the air bag door is opened.

FIG. 5 shows a cross-sectional view of the air bag assembly 100 according to an embodiment of the present disclosure, in which the air bag door 110 is opened.

As illustrated in the drawing, as the air bag 200 expands, stress is transferred to the inner surface of the air bag door 110, and the tear seam 340 and the tear line break, whereby the air bag door 110 is rotated upward from the crash pad 300.

The housing 400 includes a thickness-increased portion, which is positioned adjacent to an end of the hinge portion 120 and is increased in thickness compared to the air bag door 110.

Accordingly, when the air bag door 110 is rotated and opened upward from the crash pad 300, the hinge portion 120 breaks through interfacial delamination and the air bag door 110 is separated from the housing 400. The air bag door, which is separated from the housing 400, is rotated upward from the crash pad 300 by means of the scrim member 130, at least a portion of which is positioned at the thickness-increased portion.

The thickness-increased portion according to the present invention may have a thickness 4.3 times the thickness of the air bag door 110 or higher. When the air bag door 110 has a thickness of 0.8 mm, the housing 400 may have a thickness of 3.5 mm or greater.

In this way, stress is applied to the air bag door 110 due to expansion of the air bag 200, and the hinge portion 120 breaks owing to the applied stress. Consequently, the air bag door 110 is rotated and opened about the scrim member 130, which is positioned at at least a portion of the thickness-increased portion of the housing 400 and extends toward the air bag door 110.

In other words, according to the present disclosure, since the air bag door 110 is connected to the housing via the scrim member 130, the air bag door 110 is opened by the stress of the air bag 200, which is applied thereto, in the state in which the air bag door 110 is connected to the housing 400.

Figure 7:
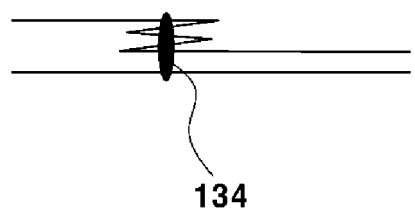
FIG. 7 is a side cross-sectional view illustrating the scrim member of the hinge structure for an air bag door according to an embodiment of the present disclosure.

FIGS. 6 and 7 show a plan view and a side cross-sectional view of the mesh structure of the scrim member 130, which is positioned at the air bag door 110, the hinge portion 120 and the housing 400.

The scrim member 130 may composed of a mesh-type woven fabric, which is constituted by the warp threads 132 and the weft threads 133. Each of the warp threads 132 may include a plurality of multiple folded layers 134 at points at which the warp threads 132 intersect the weft threads 133.

Specifically, the plurality of multiple folded layers 134 may be composed of one or more multiple folded layers and may be provided not only at the warp threads 132 but also the weft threads 132.

The regions of the warp threads 132, at which the multiple folded layers 134 are positioned, may be woven in various weaving manner such that the regions of the warp threads 132 are secured to the weft threads 133.

The warp threads including the multiple folded layers 134 are constructed so as to be elongated in a direction of tensile force when the tensile force is generated due to opening of the air bag door 110.

The warp threads 132 including the multiple folded layers 134 may be composed of threads, which are made of one or more of polyvinyl chloride (PVC), polyurethane (PU), polypropylene (PP), film-adhering threads and polyester so as to have a tensile strength of 2800N/5 cm, preferably 2400N/5 cm. The warp threads 132 may have a thickness of 2900De, and the weft threads 133 may have a thickness of 900De.

The warp threads 132 and the weft threads 133 may constitute the mesh-type scrim member 130 by weaving threads having a fracture elongation of 20% or higher.

In short, the scrim member 130 according to the present invention is configured to have a mesh shape, which is prepared by weaving a plurality of warp threads 132 and a plurality of weft threads 133 in a grid pattern. The warp threads 132 are constructed such that tensile force is applied in a direction of the warp threads when air bag door 110 is opened and such that the warp threads 132 are elongated upon opening of the air bag door 110.

Furthermore, since the main crash pad 310 is introduced into the scrim holes 131 in the housing 400 and is fused thereto, the air bag door 110 is rotated and opened by virtue of the retaining force of the scrim member 130, which is positioned at the housing 400.

Accordingly, the present disclosure provides the hinge structure of the air bag door 110, in which, when the air bag 200 expands, the hinge portion 120, which is positioned between the air bag door 110 and the housing 400 of the air bag assembly 100, is subjected to interfacial delamination, and the air bag door 110 is opened by means of the scrim member 130.

As described above, the present disclosure is able to achieve the following effects by virtue of the above-described constructions and structural relationships of the components.

The present disclosure offers an effect of eliminating a problem wherein opening of the air bag door becomes unstable due to breakage of the hinge portion.

Furthermore, the present disclosure offers an effect of allowing the air bag door to be easily opened by virtue of the elongation of the scrim member.

The above description is illustrative of the present disclosure. Further, the above disclosure is intended to illustrate and explain the preferred embodiments of the present disclosure, and the present disclosure may be used in various other combinations, modifications, and environments. In other words, the present disclosure may be changed or modified within the scope of the concept of the invention disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the above description is not intended to limit the present disclosure to the embodiments. Further, the appended claims should be construed as encompassing such other embodiments.

The invention claimed is:

1. A hinge structure for an air bag door, comprising:
   a housing disposed inside a crash pad;
   an air bag disposed inside the housing;
   an air bag door disposed on a rear surface of the crash pad adjacent to the air bag;
   a hinge portion disposed at at least a portion of a rear surface of the air bag door; and
   a scrim member disposed on at least a portion of the hinge portion, the housing and the air bag door, all the components constituting an air bag assembly,
   wherein the hinge portion is constructed so as to break when the air bag door is opened, and the scrim member serves to enable the air bag door to be opened while being connected to the housing after the hinge portion breaks; and
   wherein the hinge portion includes a notch which is formed in a location which faces the air bag.

2. The hinge structure for an air bag door of claim 1, further comprising:
   a stress-inducing portion, which is provided on the air bag door and to which stress of the air bag is applied.

3. The hinge structure for an air bag door of claim 1, further comprising:
   a scrim hole formed in the housing so as to allow the scrim member to be fused to a main crash pad.

4. The hinge structure for an air bag door of claim 1, wherein the hinge portion is constructed so as to break starting from the notch when the air bag expands.

5. The hinge structure for an air bag door of claim 1, wherein the scrim member is made of a woven fabric, which is composed of warp threads and weft threads, each of the warp threads, to which tensile force is applied when the air bag door is opened, includes one or more multiple folded layers at which the warp threads intersect the weft threads.

6. The hinge structure for an air bag door of claim 5, wherein at least one of the warp threads and the weft threads is made of polyvinyl chloride (PVC).

7. The hinge structure for an air bag door of claim 5, wherein at least one of the warp threads and the weft threads is coated with primer.

8. The hinge structure for an air bag door of claim 1, wherein the scrim member is disposed inside the air bag door and the housing, and a portion of the scrim member that is positioned at the housing is higher than a portion of the scrim member that is positioned at the air bag door.

9. The hinge structure for an air bag door of claim 1, wherein a thickness of a cross-section of the air bag door is smaller than a thickness of a cross-section of the housing adjacent to the air bag door.

10. The hinge structure for an air bag door of claim 9, wherein the housing includes a thickness-increased portion, which is positioned so as to be adjacent to the air bag door and so as to be adjacent to the hinge portion.

* * * * *